(12) United States Patent
Brahmadathan et al.

(10) Patent No.: US 7,941,587 B2
(45) Date of Patent: May 10, 2011

(54) PROGRAMMABLE SEQUENCE GENERATOR FOR A FLASH MEMORY CONTROLLER

(75) Inventors: Sandeep Brahmadathan, Kerala (IN); Anish Mathew, Kerala (IN); Bikram Banerjee, Kolkata (IN)

(73) Assignee: Cadence Design Systems, Inc, San Jose, CA (US)

( * ) Notice: Subject to any disclaimer, the term of this patent is extended or adjusted under 35 U.S.C. 154(b) by 414 days.

(21) Appl. No.: 11/856,063

(22) Filed: Sep. 17, 2007

(65) Prior Publication Data

US 2009/0077301 A1    Mar. 19, 2009

(51) Int. Cl.
*G06F 12/00* (2006.01)
(52) U.S. Cl. ...................................................... 711/103
(58) Field of Classification Search .......................... None
See application file for complete search history.

(56) References Cited

U.S. PATENT DOCUMENTS

| 6,407,949 B1 * | 6/2002 | Jha et al. ................... 365/185.33 |
| 2004/0054864 A1 * | 3/2004 | Jameson ........................ 711/167 |

* cited by examiner

*Primary Examiner* — Hiep T Nguyen
(74) *Attorney, Agent, or Firm* — Kilpatrick Townsend & Stockton LLP (57) ABSTRACT

A programmable sequence generator for controlling a flash memory device. The programmable sequence generator includes a plurality of programmable sequence registers including control phase sequence (CPS) registers and data phase sequence (DPS) registers programmed with phase sequence values corresponding to an operation command sequence of the flash memory device; and logic circuitry in a programmable command sequencer for controlling a set of states of the programmable command sequencer using the plurality of programmable sequence registers.

14 Claims, 6 Drawing Sheets

Cache_RD_CPS and Cache_RD_DPS registers

Control Phase Sequence Registers(CPS)

| VALID/INVALID | CPS-STATE INFORMATION | INTERRUPT/WAIT | COMMAND VALUE |
|---|---|---|---|
| 1 | 1(COMMAND) | 0 | 00h |
| 1 | 2 (ADDRESS) | 0 | xx |
| 1 | 1 (COMMAND) | 1 | 31h |
| 0 | xx | x | xx |

505

Data Phase Sequence Registers(DPS)

| VALID/INVALID | CPS-STATE INFORMATION | INTERRUPT/WAIT | COMMAND VALUE |
|---|---|---|---|
| 1 | 3 (DATA) | 0 | XX |
| 1 | 5 (CLEAR ALL DATA SEQUENCE INFO & REPEAT DATA SEQUENCE) | 0 | XX |
| 0 | XX | X | XX |
| X | XX | XX | XX |

510

Exit_Cache_RD_CPS and Exit_Cache_RD_DPS

Control Phase Sequence Registers(CPS)

| VALID/INVALID | CPS-STATE INFORMATION | INTERRUPT/WAIT | COMMAND VALUE |
|---|---|---|---|
| 0 | XX | X | XX |
| X | XX | X | XX |
| X | XX | X | XX |
| X | XX | X | XX |

515

Data Phase Sequence Registers(CPS)

| VALID/INVALID | DPS-STATE INFORMATION | INTERRUPT/WAIT | COMMAND VALUE |
|---|---|---|---|
| 1 | 3 (DATA) | 0 | XX |
| 1 | 1 (COMMAND) | 0 | 34h |
| 0 | XX | X | XX |
| X | XX | XX | XX |

Cache_RD_CPS and Cache_RD_DPS registers

Control Phase Sequence Registers(CPS)

| VALID/INVALID | CPS-STATE INFORMATION | INTERRUPT/WAIT | COMMAND VALUE |
|---|---|---|---|
| 1 | 1(COMMAND) | 0 | 00h |
| 1 | 2 (ADDRESS) | 0 | xx |
| 1 | 1 (COMMAND) | 1 | 30h |
| 0 | xx | x | xx |

605

Data Phase Sequence Registers(DPS)

| VALID/INVALID | CPS-STATE INFORMATION | INTERRUPT/WAIT | COMMAND VALUE |
|---|---|---|---|
| 1 | 3 (DATA) | 0 | XX |
| 1 | 3 (DATA) | 0 | XX |
| 1 | 5 (CLEAR ALL DATA SEQUENCE INFO AND REPEAT DATA SEQUENCE) | 0 | XX |
| X | XX | XX | XX |

610

Exit_Cache_RD_CPS and Exit_Cache_RD_DPS

Control Phase Sequence Registers(CPS)

| VALID/INVALID | CPS-STATE INFORMATION | INTERRUPT/WAIT | COMMAND VALUE |
|---|---|---|---|
| 0 | XX | X | XX |
| X | XX | X | XX |
| X | XX | X | XX |
| X | XX | X | XX |

615

Data Phase Sequence Registers(CPS)

| VALID/INVALID | DPS-STATE INFORMATION | INTERRUPT/WAIT | COMMAND VALUE |
|---|---|---|---|
| 1 | 1 (COMMAND) | 1 | 3Fh |
| 1 | 3 (DATA) | 0 | XX |
| 0 | XX | X | XX |
| X | XX | XX | XX |

PROGRAMMABLE SEQUENCE GENERATOR FOR A FLASH MEMORY CONTROLLER

BACKGROUND

Embodiments of the invention relate generally to a flash memory controller and more particularly to programmable sequence generation in a flash memory controller.

A flash memory device, for example a NAND flash memory device, includes a plurality of blocks, each of which has a predetermined size for preserving data similar to a cluster of a hard disk. A Read/Write operation to a NAND flash memory device is performed with a block and a page as a processed unit. For example, an I/O (Input/Output) port with, 8 bits may be used by a NAND flash memory device. A NAND flash memory device accesses data in sequence and the access mode is in a serial fashion. A NAND flash memory controller provides interaction capabilities between a NAND flash memory device and a host.

A typical operation command sequence for accessing a NAND flash memory device includes a control sequence followed by, if necessary, a data sequence. The control sequence includes the command(s) and addresses (block/page/column) for the intended operation provided to the NAND flash memory device. The data sequence includes data to be read from or written to the NAND flash memory device followed by, if necessary, a command.

NAND flash memory devices from different vendors and different NAND flash memory devices from the same vendor are inherently different in their command sets and command sequences. A NAND flash memory controller needs to be able to communicate with a wide variety of such NAND flash memory devices which are different in their command sets and command sequences.

Further explaining differences in operation command sequence of various NAND flash memory devices, FIG. 1 illustrates timing diagrams 100 of two different NAND flash memory devices performing a similar type of operation according to the prior art. Timing diagram 105 of a first NAND flash memory device illustrates a cache read operation which includes '00h/Address/31h' as the control sequence and '1st page/2nd page/3rd page/ . . . /last page/34h' as the data sequence. Timing diagram 110 of a second NAND flash memory device illustrates a cache read operation which includes '00h/Address/30h' as the control sequence and '31h/Data output/31h/Data output/ . . . /3Fh/Data' output as the data sequence. These examples show the obvious differences in the operation command sequences for the same type of operation between NAND flash memory devices of different manufacturers. Similar to the above case, there are differences in the command sequences of many operations between NAND flash memory devices of different manufacturers and in some cases even between different NAND flash memory devices made by the same manufacturer.

Thus, an important challenge of designing a flash memory controller lies in its adaptability to the flash memory devices of the present and of the future.

SUMMARY

Embodiments of the invention described herein provide a system and method for controlling a flash memory device using a programmable sequence generator of a flash memory controller.

An exemplary embodiment of the invention provides a programmable sequence generator of a flash memory controller for controlling a flash memory device. The programmable sequence generator includes a plurality of programmable sequence registers including control phase sequence (CPS) registers and data phase sequence (DPS) registers programmed with phase sequence values corresponding to an operation command sequence of the flash memory device, and a logic circuitry in a programmable command sequencer for controlling a set of states of the programmable command sequencer using the plurality of programmable sequence registers.

An exemplary embodiment of the invention provides a flash memory system. The flash memory system includes a flash memory controller including a programmable command sequencer for controlling a flash memory device coupled to the flash memory controller, a plurality of programmable sequence registers including control phase sequence (CPS) registers and data phase sequence (DPS) registers, the programmable sequencer registers programmed with phase sequence values corresponding to an operation command sequence of the flash memory device, and a logic circuitry in a programmable command sequencer for controlling a set of states of the programmable command sequencer operable in a sequence track state to advance from the one the state to another.

An exemplary embodiment of the invention provides a method for controlling a flash memory device. A plurality of programmable sequence registers of a flash memory controller is programmed with phase sequence values corresponding to an operation command sequence of the flash memory device coupled to a flash memory controller. These phase sequence values are used to control state transitions of one or more states of a programmable command sequencer of the flash memory controller.

Other aspects and example embodiments are provided in the Figures and the Detailed Description that follows.

BRIEF DESCRIPTION OF THE DRAWINGS

FIG. 1 illustrates timing diagrams of two different NAND flash memory devices performing similar types of operations according to the prior art;

FIG. 2 is a block diagram illustrating a programmable sequence generator for generating programmable command sequences according to an embodiment of the invention;

DETAILED DESCRIPTION OF THE EMBODIMENTS

Embodiments of the invention described herein provide a method and system for controlling a flash memory device using a programmable sequence generator of a flash memory controller. For simplicity, embodiments of the invention have been explained using a NAND flash memory device as an example.

Embodiments of the invention use the fact that communications to a NAND flash memory device can be grouped into three basic sets, namely a command set, an address set and a data set, and by controlling the state transitions of a set of states of a programmable command sequencer, a NAND flash memory controller can communicate with various NAND flash memory devices. The command set includes the set of commands sent to the device, the address set includes the set of addresses sent to the NAND flash memory device and the data set includes reading/writing data from/to the NAND flash memory device.

FIG. 2 is a block diagram 200 illustrating a programmable sequence generator 220 according to an embodiment of the invention. The block diagram 200 includes a NAND flash memory device 210 coupled to a host 205 through a NAND flash memory controller 215. The NAND flash memory controller 215 includes a programmable sequence generator 220 which in turn includes a set of programmable sequence registers 230 and a programmable command sequencer 225. The programmable sequence registers 230 include Command Phase Sequence (CPS) registers 235, Data Phase Sequence (DPS) registers 240 and a register 245. The programmable command sequencer 225 includes logic circuitry 250.

The programmable sequence registers 230 are programmed with phase sequence values according to an operation command sequence of the NAND flash memory device 210. The operation command sequence of a NAND flash memory device 210 can be grouped as a command phase and a data phase. The command phase sequence values are programmed to the CPS registers 235 and the data phase sequence values are programmed in the DPS registers 240. These programmable sequence registers 230 include information which is provided to a programmable command sequencer 225 of the programmable sequence generator 220 for controlling the state transitions of the programmable command sequencer 225. Logic circuitry 250 in the programmable command sequencer 225 is used to control the state transitions of the programmable command sequencer 225.

According to an embodiment of the invention, the programmable sequence registers 230 are programmed with phase sequence values of an operation command sequence from a NAND flash memory device 210 automatically, at power on of the NAND flash memory controller 215. By using the embodiments of the invention, the programmable command sequencer 225 can easily adapt to communicate to any NAND flash memory device 210 by re-programming the programmable sequence registers 230. If a new NAND flash memory device 210 is coupled to the NAND flash memory controller 215 with a different operation command sequence that the NAND flash memory controller 215 is not aware of, embodiments of the invention can be used to reprogram a set of programmable sequence registers 230 to interact with that NAND flash memory device 210 without loss in hardware abstraction.

Figure 3:
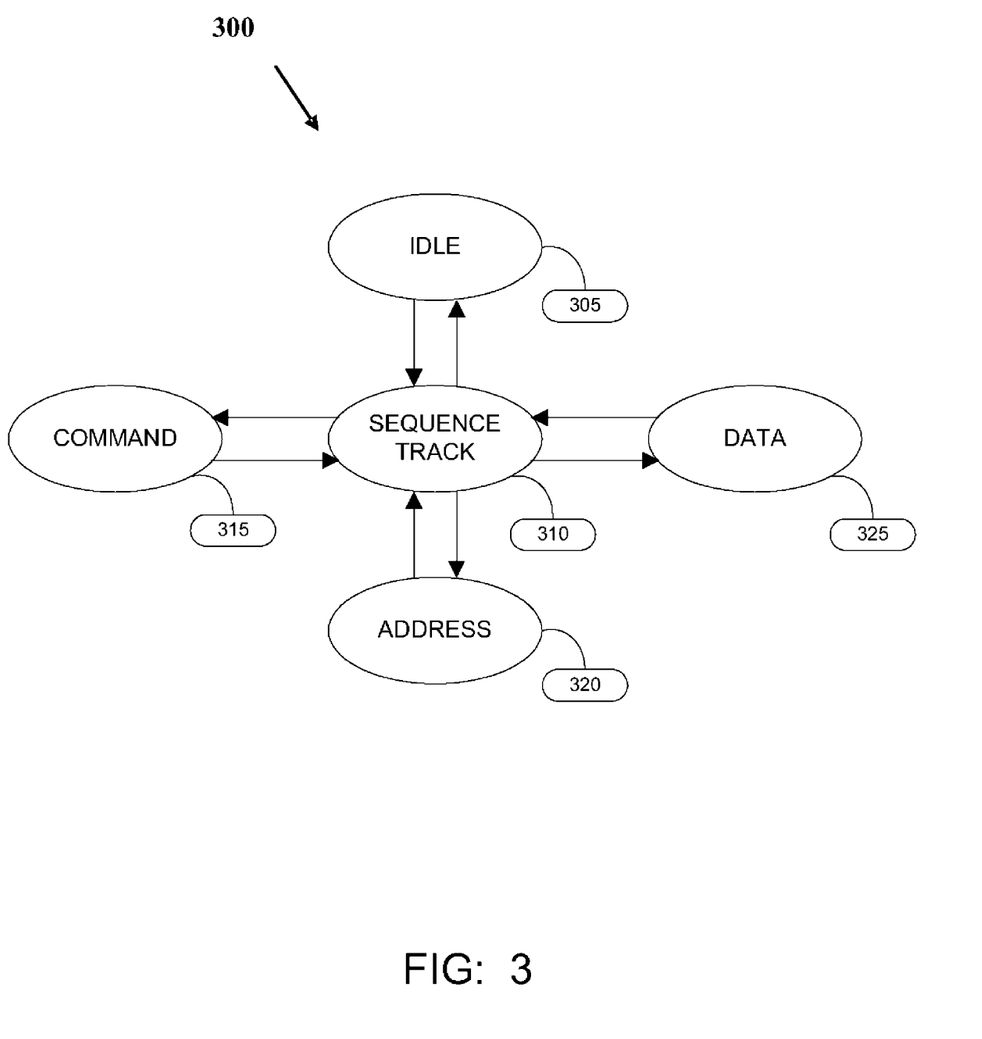
FIG. 3 is a diagram illustrating various states of a programmable command sequencer according to an embodiment of the invention.

FIG. 3 is a diagram 300 illustrating various states of a programmable command sequencer 225 according to an embodiment of the invention. The programmable command sequencer 225 includes an idle state 305, a command state 315, an address state 320, a data state 325, and a sequence track state 310. Upon detecting a request in the idle state 305, logic circuitry 250 recognizes a type of operation to be performed and loads a register 245 with the corresponding operation. The values stored in the register 245 are used as a select to decide upon the present operation sequence that the programmable command sequencer 225 should execute. After the Idle state 305, the programmable command sequencer 225 moves to a sequence track state 310. In the sequence track state 310, the logic decides which state to move to next, depending on the values programmed in the CPS 235 and DPS 240 registers. For example, if a sequence track state transition occurs at the start of an operation, the logic circuitry 250 starts to execute the control phase sequence, for example, CPS1, CPS2, CPS3 and CPS 4. The logic circuitry 250 accesses the phase sequence values stored in CPS1, and with the state information present in CPS1 jumps to the corresponding state. Subsequent entry into sequence track state 310 executes CPS2 till the logic circuitry 250 realizes that the control phase sequence is executed. After completing the execution of the control phase sequence, the logic moves into the DPS registers 240 and executes the phase sequence values till the entire operation command sequence is completed.

In one embodiment of the invention, a set of tracking registers (not shown in FIG. 3, 300) which are part of the register 245, are provided which keeps track of a last executed sequence number. Upon executing every sequence, the tracking registers are updated which helps the programmable command sequencer 225 to decide which sequence register to look into next. In the command state 315, a command is sent out to the NAND flash memory device 210. On completion of command state 315, the programmable command sequencer 225 returns to the sequence track state 310. Information of the command value is present in the programmable sequence registers 230. In the address state 320, the address is sent out to the device. On completion, the programmable command sequencer 225 returns to the sequence track state 310. In the data state 325, the data is moved from/to the device. On completion, the programmable command sequencer 225 returns to the sequence track state 310.

The logic in the NAND flash memory controller 215 directs the programmable command sequencer 225 to finish the data sequence and then clears all tracking registers relating to the control and data sequences. This allows programmable command sequencer 225 to repeatedly execute same sequences, both command and data sequences.

Figure 4:
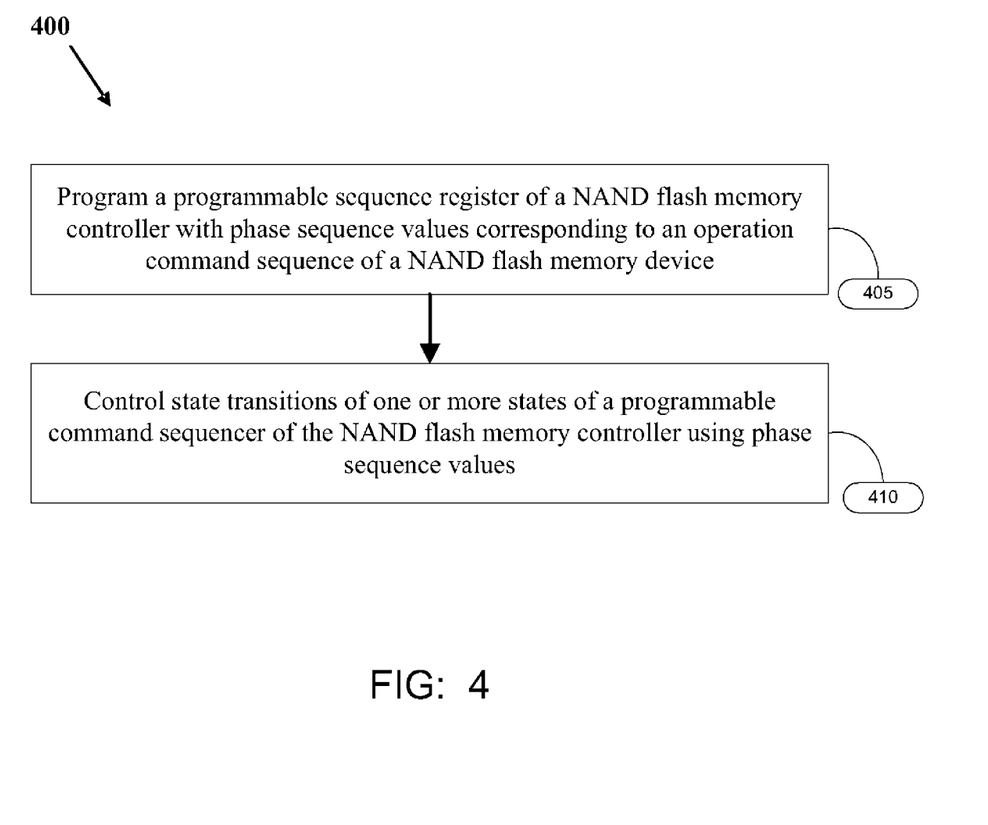
FIG. 4 is a flow diagram illustrating the steps in a method for generating programmable command sequences for a NAND flash memory controller according to an embodiment of the invention.

FIG. 4 is a flow diagram 400 illustrating the steps in a method for generating programmable command sequences for a NAND flash memory controller 215 according to an embodiment of the invention.

At step 405, a set of programmable sequence registers 230 of a NAND flash memory controller 215 is programmed with phase sequence values corresponding to an operation command sequence of a NAND flash memory device 210. Step 405 programs the CPS register 235 with phase sequence values corresponding to a command phase sequence of the operation command sequence and programs the DPS register 240 with phase sequence values corresponding to a data phase sequence of the operation command sequence. For example, for a read operation there is a set of CPS registers 235 and DPS registers 240 which include, for example, Read_CPS_1, Read_CPS_2, Read_CPS_3, Read_CPS_4, Read_DPS_1, Read_DPS_2, Read_DPS_3, and Read_DPS_4 (4 states of CPS and 4 states of DPS). In general, for each operation in the NAND flash memory device 210, there is an associated set of CPS 235 and DPS 240 registers in the NAND flash memory controller 215.

At step 410, state transitions of one or more states of the programmable command sequencer 225 of the NAND flash memory controller 215 is controlled using the phase sequence values in the programmable sequence registers 230. For controlling the state transitions, a type of operation to be performed in the NAND flash memory controller 215 is determined and a register 245 is updated with phase sequence values from the programmable sequence registers 230 corresponding to the type of operation. Further, the phase sequence values from the register 245 are used to control state transitions of one or more states of the programmable command sequencer 225.

Figure 5:
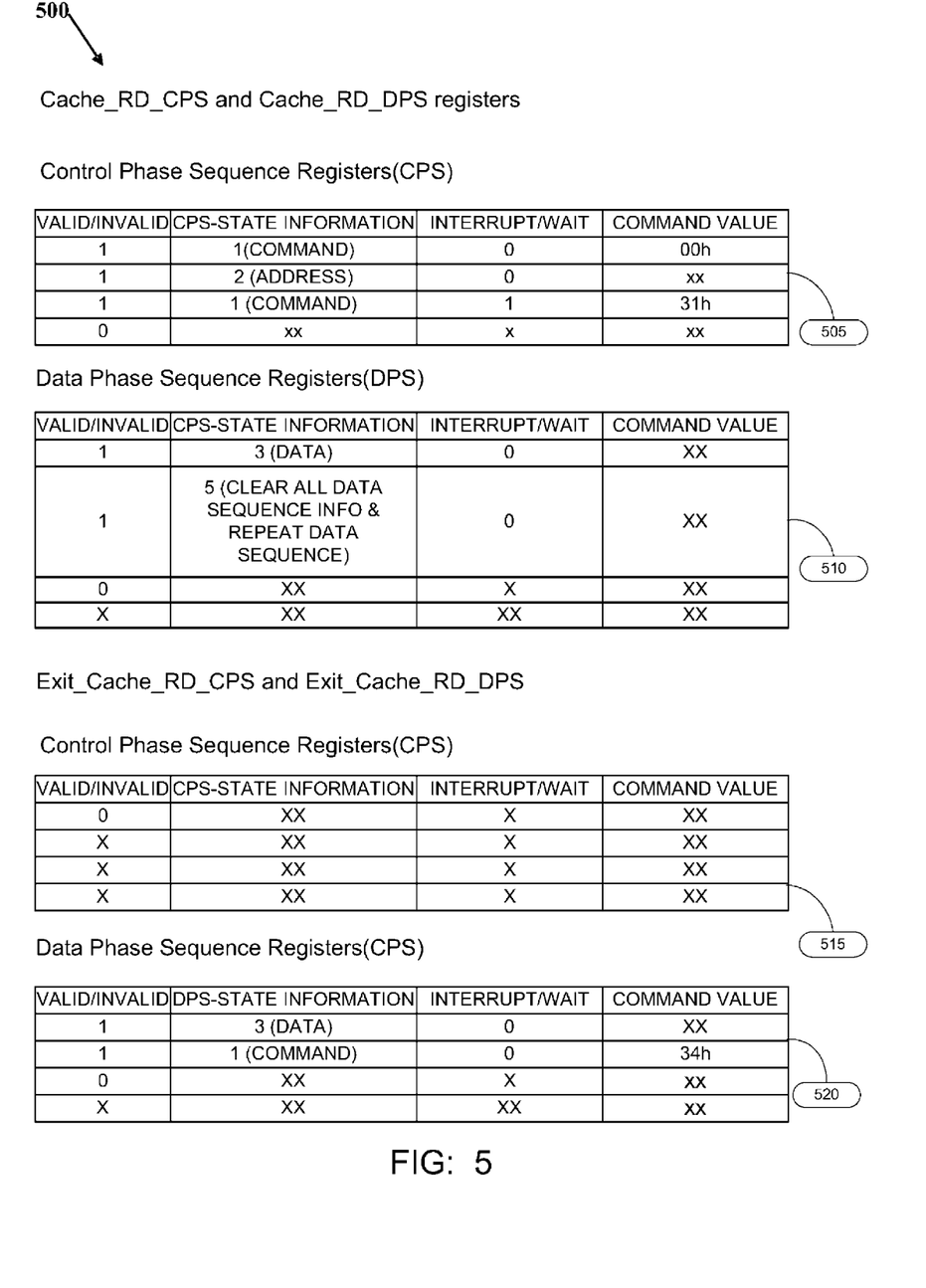
FIG. 5 and FIG. 6 illustrate the contents of programmable sequence registers for two different NAND flash memory devices performing a cache read operation according to an embodiment of the invention.
Figure 6:
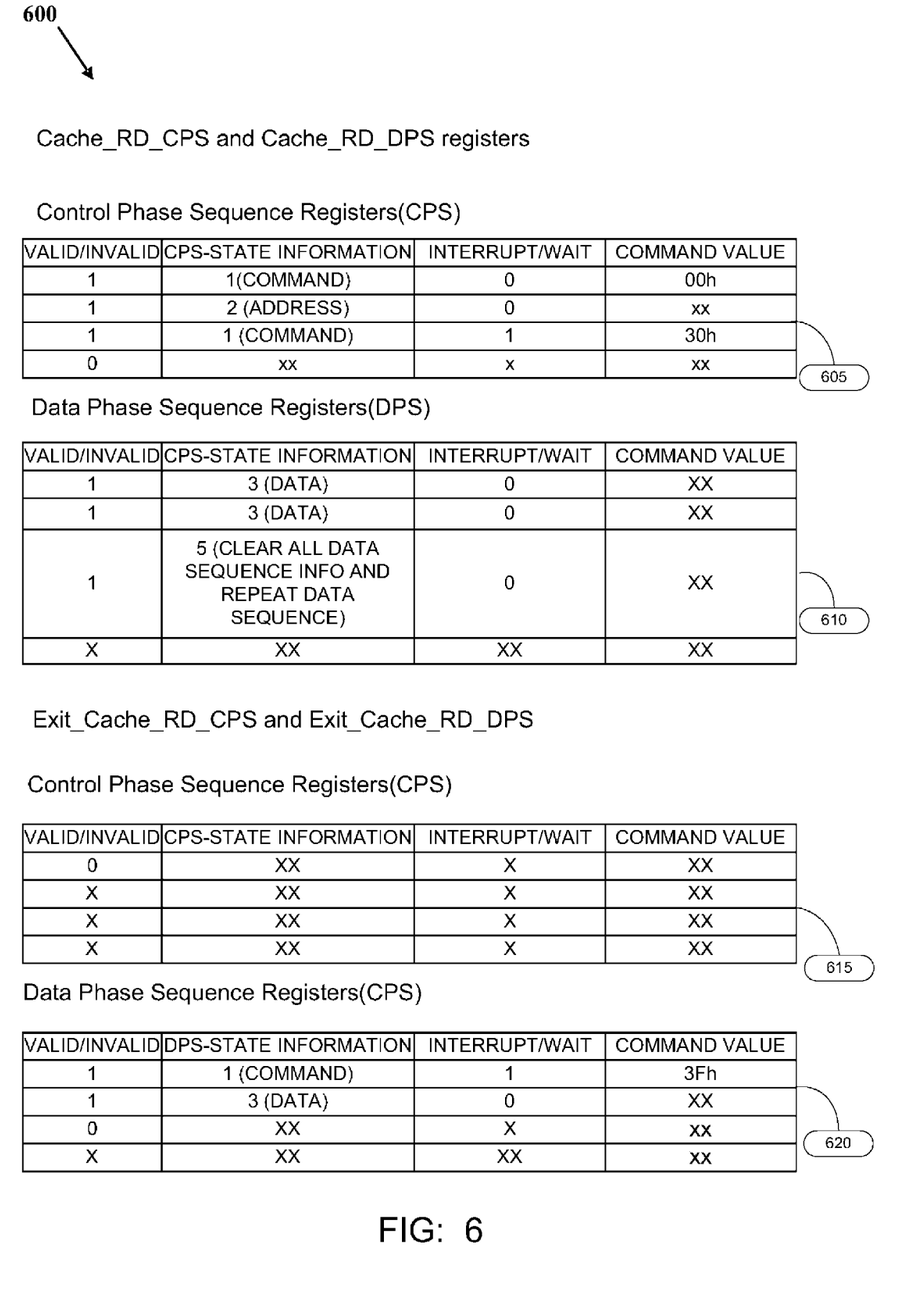

FIG. 5 and FIG. 6 illustrate how embodiments of the invention can be used to support a same type of operation for two different NAND flash memory devices. FIG. 5 illustrates the content of the programmable sequence registers 500 for a cache read operation of a first NAND flash memory device. The cache read operation is divided into two operations namely, cache read operation (Cache_RD) and exit cache read operation (Exit_Cache_RD). In FIG. 5, CPS and DPS registers are labeled as Cache_RD_CPS register 505; Cache_RD_DPS register 510 in a Cache read operation and as Exit_Cache_RD_CPS register 515; Exit_Cache_RD_DPS register 520 in an exit cache read operation.

When a cache read operation is performed, the Cache_RD (Cache_RD_CPS 505 and Cache_RD_DPS 510) sequence is followed. A command of 00h is sent first followed by the targeted address. A command of 31h is sent after which the programmable command sequencer 225 waits for an interrupt. In Cache_RD_CPS register 505, CPS4 ($4^{th}$ state of the CPS state information) is invalid. Therefore, the sequence track state 310 exits the control phase sequence and begins to execute the data phase sequence. After the execution of the data phase sequence, a page of data is transferred and all tracking information related to data sequence is reset. The sequence track state 310 executes data phase sequence again. After execution, the next page of data is transferred. This process continues till the last page of data is transferred. Once it is detected that the last page is to be transferred, Exit_Cache_RD (Exit_Cache_RD_CPS 515 and Exit_Cache_RD_DPS 520) sequence is followed. After the execution of Exit_Cache_RD, the last page is transferred and a command 34h (exit cache) is sent out.

FIG. 6 illustrates the contents of the programmable sequence registers 600 for a cache read operation of a second NAND flash memory device. In FIG. 6, the CPS and DPS registers are labeled as Cache_RD_CPS register 605, and Cache_RD_DPS register 610 in a Cache read operation; and as Exit_Cache_RD_CPS register 615, and Exit_Cache_RD_DPS register 620 in an exit cache read operation.

When a cache read operation is performed, the Cache_RD (Cache_RD_CPS 605 and Cache_RD_DPS 610) sequence is followed. A command of 00h is sent first followed by the targeted address. A command of 30h is sent to after which the programmable command sequencer 225 waits for an interrupt. In Cache_RD_CPS register 605, CPS4 ($4^{th}$ state of the CPS state information) is invalid. Therefore, the sequence track state 310 exits the control phase sequence and begins to execute the data phase sequence. In the data phase sequence, a command of 31h is sent after which the programmable command sequencer 225 waits for an interrupt. Further, a page of data is transferred. All tracking information related to data sequence is reset at this stage. A command of 31h is sent again after which the programmable command sequencer 225 waits for an interrupt and the next page of data is transferred. This process continues till the last page of data is transferred. Once it is detected that the last page is to be transferred, the Exit_Cache_RD (Exit_Cache_RD_CPS 615 and Exit_Cache_RD_DPS 620) sequence is followed. A command of 3Fh is sent and the programmable command sequencer 225 waits for an interrupt, after which the last page of data is transferred. Since DPS4 ($4^{th}$ state of the DPS state information) is invalid in Exit_Cache_RD_DPS register 620, sequence track 310 recognizes that the entire sequence is completed and resets tracking information for command sequence and data sequence and goes back to 'idle state' 305.

The aforementioned examples illustrate the differences in operation command sequences how the programmable command sequencer 225 easily adapts to communicate with both NAND flash memory devices seamlessly by re-programming the programmable sequence registers. In the first NAND flash memory device, a data sequence is followed by a command sequence in the Exit Cache read operation in DPS register, whereas in the second NAND flash memory device command sequence is followed by data sequence. By re-programming in the programmable command register 230, embodiments of the invention can support both the NAND flash memory devices. In a similar way the programmable command sequencer 225 can be programmed for all operations supported by a NAND flash memory device 210.

It will be appreciated that the embodiments of the invention explained using NAND flash memory device as an example is provided by way of illustration, and not limitation. Those knowledgeable in the art will recognize that the embodiments of the invention can be used for other types of flash memory devices including NOR flash memory devices.

The forgoing description sets forth numerous specific details to convey a thorough understanding of the invention. However, it will be apparent to one skilled in the art that the invention may be practiced without these specific details. Well-known features are sometimes not described in detail in order to avoid obscuring the invention. Other variations and embodiments are possible in light of above teachings, and it is thus intended that the scope of invention not be limited by this Detailed Description, but only by the following Claims.

What is claimed is:

1. A programmable flash memory controller for controlling a flash memory device, said programmable flash memory controller comprising:
   a plurality of programmable registers including control phase sequence (CPS) registers and data phase sequence (DPS) registers programmed with values corresponding to an operation command sequence of said flash memory device; and
   a command sequence generator for controlling access to said flash memory device using said values in said plurality of programmable registers,
   wherein at power on of said programmable flash memory controller, said plurality of programmable registers is programmed with said values automatically.

2. The programmable flash memory controller of claim 1, wherein said command sequence generator includes a state machine, and wherein at least one state of said state machine is dependent on at least one value in one of said programmable registers.

3. The programmable flash memory controller of claim 2 wherein said state machine includes a state identifier, said state identifier advances from one state to another, in an idle state to detect an incoming request, a command state to obtain a command from the programmable sequence registers and to send said command to the flash memory device, an address state to send an address to the flash memory device and a data state to move data to or from the flash memory device.

4. The programmable flash memory controller of claim 1, wherein said control phase sequence registers are programmed with phase sequence values corresponding to a command phase sequence of an operation command sequence; and
   said data phase sequence registers are programmed with phase sequence values corresponding to a data phase sequence of an operation command sequence.

5. The programmable flash memory controller of claim 1 wherein the command sequence generator includes:
   logic circuitry for determining a type of operation to be performed in the command sequence generator used for controlling the flash memory device; and a register updated with phase sequence values from the plurality of programmable sequence registers corresponding to said type of operation.

6. A flash memory system comprising:
   a flash memory controller including a programmable sequence generator for controlling a flash memory device coupled to said flash memory system;
   a plurality of programmable registers including control phase sequence (CPS) registers and data phase sequence (DPS) registers, said programmable registers programmable with phase sequence values corresponding to an operation command sequence of said flash memory device; and
   a command sequence generator including a state machine wherein said state machine includes a state identifier, said state identifier advances from one state to another, in an idle state to detect an incoming request, a command state to obtain a command from the programmable sequence registers and to send said command to the flash memory device, an address state to send an address to the flash memory device and a data state to move data to or from the flash memory,
   wherein at power on of said programmable flash memory controller, said plurality of programmable registers is programmed with said values automatically.

7. The flash memory system of claim 6, wherein said control phase sequence registers are programmed with phase sequence values corresponding to a command phase sequence of an operation command sequence; and
   said data phase sequence registers programmed with phase sequence values corresponding to a data phase sequence of an operation command sequence.

8. The flash memory system of claim 6 wherein said command sequence generator includes:
   logic circuitry for determining a type of operation to be performed in the command sequence generator used for controlling the flash memory device; and
   a register updated with phase sequence values from the plurality of programmable sequence registers corresponding to said type of operation.

9. A method for controlling a flash memory device comprising:
   programming a plurality of programmable sequence registers of a flash memory controller with phase sequence values corresponding to an operation command sequence of said flash memory device coupled to said flash memory controller; and
   controlling state transitions of one or more states of a command sequence generator of the flash memory controller using said phase sequence values,
   wherein said plurality of programmable registers is programmed with said phase sequence values automatically at power on of said flash memory controller.

10. The method of claim 9, wherein said programming comprises:
    programmable control phase sequence registers of said plurality of programmable sequence registers with the phase sequence values corresponding to a command phase sequence of said operation command sequence; and
    programming data phase sequence registers of the programmable sequence registers with the phase sequence values corresponding to a data phase sequence of the operation command sequence.

11. The method of claim 9, wherein said controlling state transitions comprises:
    controlling a state identifier to advance from one state to another, in an idle state to detect an incoming request, a command state to obtain a command from the programmable sequence registers and to send said command to the flash memory device, an address state to send an address to the flash memory device and a data state to move data to or from the flash memory device.

12. The method of claim 9, wherein said controlling comprises:
    determining a type of operation to be performed in the flash memory controller;
    updating a register with phase sequence values from the programmable sequence registers corresponding to said type of operation; and
    using said phase sequence values from said register to control state transitions of one or more states of the command sequence generator.

13. A programmable flash memory controller for controlling a flash memory device, said programmable flash memory controller comprising:
    a plurality of programmable registers including control phase sequence (CPS) registers and data phase sequence (DPS) registers programmed with values corresponding to an operation command sequence of said flash memory device; and
    a command sequence generator for controlling access to said flash memory device using said values in said plurality of programmable registers,
    wherein said plurality of programmable registers is programmed with said values received from said flash memory device.

14. A flash memory system comprising:
    a flash memory controller including a programmable sequence generator for controlling a flash memory device coupled to said flash memory system;
    a plurality of programmable registers including control phase sequence (CPS) registers and data phase sequence (DPS) registers, said programmable registers programmable with phase sequence values corresponding to an operation command sequence of said flash memory device; and
    a command sequence generator including a state machine wherein said state machine includes a state identifier, said state identifier advances from one state to another, in an idle state to detect an incoming request, a command state to obtain a command from the programmable sequence registers and to send said command to the flash memory device, an address state to send an address to the flash memory device and a data state to move data to or from the flash memory,
    wherein said plurality of programmable registers is programmed for each type of operation command sequences at power on of the flash memory controller.

* * * * *